United States Patent
Hayward et al.

(10) Patent No.: US 6,222,848 B1
(45) Date of Patent: Apr. 24, 2001

(54) GIGABIT ETHERNET INTERFACE TO SYNCHRONOUS OPTICAL NETWORK (SONET) RING

(75) Inventors: Kenneth G. Hayward, Kanata; Donald R. Ellis, Ottawa; John P Brule, Spencerville; Michael C. To, Nepean, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/996,172

(22) Filed: Dec. 22, 1997

(51) Int. Cl.[7] ........................................... H04J 3/02
(52) U.S. Cl. ................ 370/412; 370/222; 370/395; 370/403
(58) Field of Search ................... 370/217, 221, 370/222, 225, 389, 395, 401, 402, 403, 404, 405, 412, 413, 415, 417, 414

(56) References Cited

U.S. PATENT DOCUMENTS

| | | | |
|---|---|---|---|
| 5,103,447 | 4/1992 | Takiyasu et al. | 370/85.15 |
| 5,159,595 | 10/1992 | Flanagan et al. | 370/85.15 |
| 5,179,548 | 1/1993 | Sandesara | 370/16.1 |
| 5,280,481 | 1/1994 | Chang et al. | 370/85.13 |
| 5,323,388 | 6/1994 | Chang et al. | 370/60 |
| 5,365,510 | 11/1994 | Nicholson et al. | 370/16 |
| 5,414,704 | * 5/1995 | Spinney | 370/389 |
| 5,430,728 | 7/1995 | Narayanan et al. | 370/85.13 |
| 5,444,694 | 8/1995 | Millet et al. | 370/16.1 |
| 5,446,725 | 8/1995 | Ishiwatari | 370/16.1 |
| 5,452,297 | * 9/1995 | Hiller et al. | 370/395 |
| 5,533,005 | 7/1996 | Ferguson | 370/16 |
| 5,533,006 | 7/1996 | Uchida et al. | 370/16.1 |
| 5,537,393 | 7/1996 | Shioda et al. | 370/16.1 |
| 5,577,033 | 11/1996 | Chang et al. | 370/60 |
| 5,636,205 | 6/1997 | Suzuki et al. | 370/224 |
| 5,870,396 | * 2/1999 | Abu-Amara et al. | 370/413 |

* cited by examiner

Primary Examiner—Douglas Olms
Assistant Examiner—Shick Hom

(57) ABSTRACT

A method and apparatus for routing data packets via a synchronous optical (SONET) network from devices connected to a local area network to devices connected to other local area networks. At each transport node in the SONET network the data packets are unloaded from SONET payloads and requeued for transmission on an output path. This allows for easy resolution of contention between devices transmitting at the same time and avoids pre-assigning SONET channels. Source and destination address information from the data packets can be used to route the data packets through the SONET network. A time-to-live indicator can be used to find the shortest path to a destination address in a SONET ring network or any bidirectional ring network.

22 Claims, 4 Drawing Sheets

GIGABIT ETHERNET INTERFACE TO SYNCHRONOUS OPTICAL NETWORK (SONET) RING

FIELD OF INVENTION

This invention is concerned with an apparatus and method by which packetized data from a local area network can be transmitted over a synchronous optical (SONET) network. This invention is also concerned with a method for selecting the shortest path to a destination address in a bidirectional ring network.

BACKGROUND OF THE INVENTION

Local area networks, or LANS, are used to transmit packetized data. One type of LAN is known as the Ethernet which conforms to a family of IEEE standards, IEEE 802.3. Although Ethernet LANs have been produced for over 20 years, recent technological advances have increased the speed at which devices connected to the ethernet LAN can transmit and receive data. In IEEE draft standard 802.3z an Ethernet LAN capable of gigabit per second transmission rates is proposed. However, one limitation of current ethernet LANs is that they must limit the distance between devices to about 2 km, in order to allow their carrier-sense multiple-access collision-detection (CSMA/CD) contention management systems to function effectively. A description of local area networks is found in the textbook *Basic Data Communications: A Comprehensive Overview* by W. J. Beyda which is hereby incorporated by reference for all purposes.

Data transmitted over a LAN is packetized or subdivided into a stream of segments of varying length. Packet flow is often described as "bursty". Packets may flow intensely between two devices connected to the LAN and then flow may suddenly drop to zero. When packets flow intensely from a number of different devices simultaneously, contention problems may arise and it is necessary to share the bandwidth on the LAN between contending devices.

It would be desirable for devices connected to an ethernet LAN to be able to transmit data to or receive data from devices connected to separate ethernet LANS. In this regard, it is known to use expensive special purpose wide area network (WAN) routers interposed between LANs.

SUMMARY OF THE INVENTION

It is an object of the present invention to provide a method and apparatus by which devices connected to a local area network can send packetized data through a SONET network to devices connected to other local area networks.

It is a further object of the present invention to allow the capacity on SONET payloads between specified transport nodes to remain unassigned if the capacity is not needed for carrying data packets between those transport nodes.

It is another object of the present invention to rationally share bandwidth dynamically on a SONET network between contending packetized devices.

It is another object of the present invention to provide a method to find the shortest route to a destination address on a bi-directional ring network.

In one aspect there is provided a method for routing data packets at a transport node of a SONET network comprising: receiving SONET payloads having data packet at said transport node; removing said data packets from said SONET payloads; for each data packet of said data packets: determining a destination address; determining if an entry exists in a table associated with said transport node matching said destination address; and if a matching entry does not exist, queuing said each data packet on a first queue for a first output path and a copy of said each data packet on a second queue for a second output path; transmitting selected data packets from said first queue onto said first output path; and transmitting selected data packets from said second queue onto said second output path.

another aspect, there is provided a method for routing data packets at a transport node of a SONET network comprising: receiving SONET payloads having data packets at said transport node; removing said data packets from said SONET payloads; for each data packet of said data packets: determining whether a current time-to-live "TTL" indicator having a current value has been appended to said each data packet; if said current TTL indicator has been appended to said each data packet, adjusting said current value of said current TTL indicator and where any said current value bears a pre-defined relationship to a threshold, outputting said each data packet.

Apparatus is also provided to achieve these methods.

Other features and aspects of the invention will become apparent from the following description in conjunction with the following drawings.

BRIEF DESCRIPTION OF THE FIGURES

The present invention will be better understood with reference to the detailed description in which.

DETAILED DESCRIPTION OF THE PREFERRED EMBODIMENTS

Figure 1:
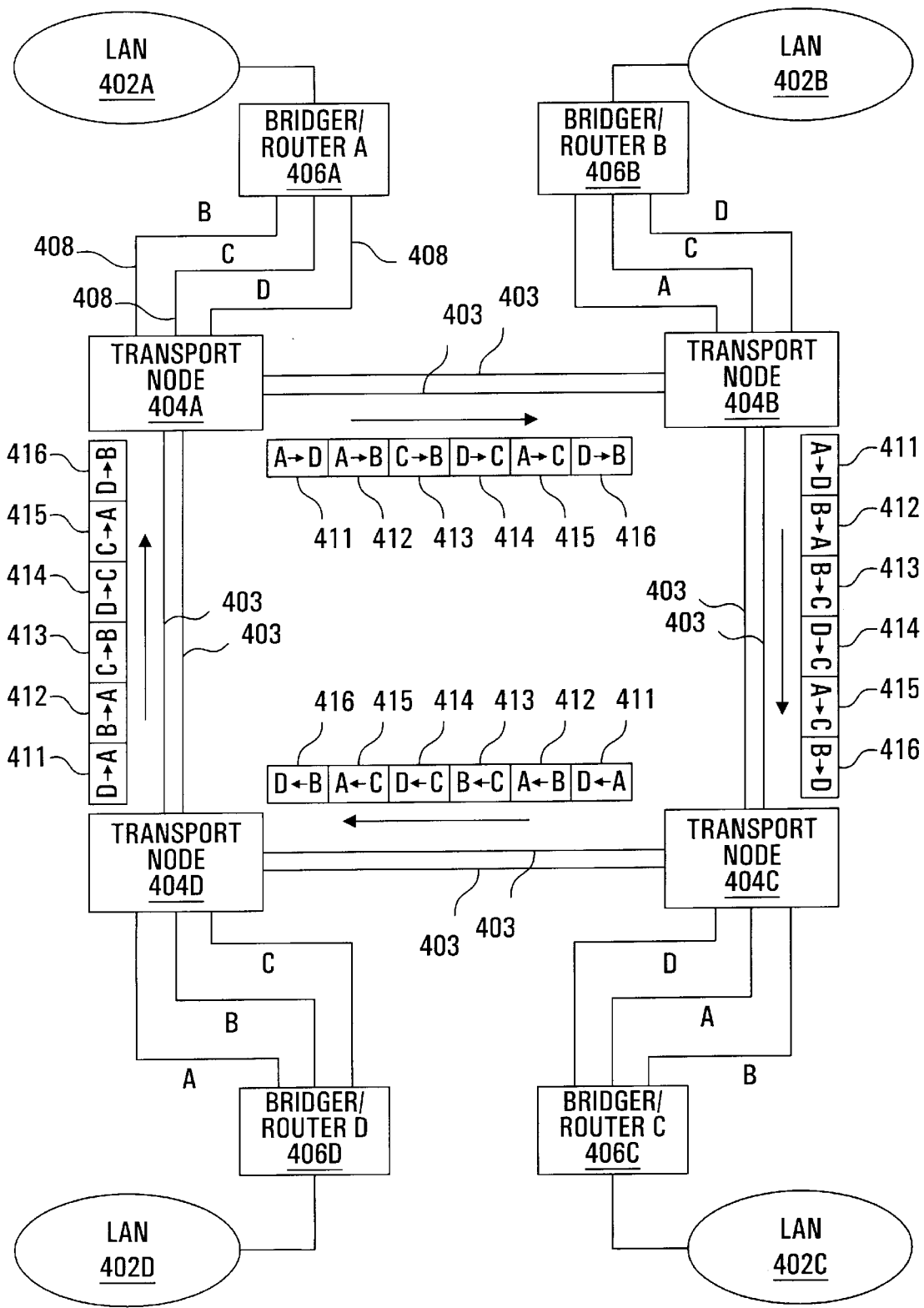
FIG. 1 is a schematic drawing of a known communications system.

SONET or "synchronous optical network" is a standard for synchronous digital fibre-optic networks. An equivalent international standard, the Synchronous Digital Hierarchy (SDH) has been adapted by the International Telecommunications Union (ITU), formerly the International Telegraph and Telephone Consultative Committee (CCITT). These standards define standard rates, frame formats, and optical signal parameters for signals passed on fibre-optic cables between transport nodes. SONET networks are described in *Digital Telephony*, Second Edition, by J. Bellamy, which is hereby incorporated by reference for all purposes.

In SONET, a basic building block is the synchronous transport signal level 1 (STS-1) frame. Each frame is a 9 row by 90 column byte matrix which is serially transmitted such that the byte from row one, column one, is transmitted first, followed by the byte from row one, column two, and so on, from left to right and from top to bottom. An STS frame is transmitted every 125 micro-seconds or at 8 kHz. This 8 kHz transmission of frames is known as a channel. A number of channels can be transmitted on a single optical fibre. If N channels are transmitted this is known as STS-N. The N channels are interleaved so that every 125 microseconds the frames from all N channels are transmitted. The STS-1 format results in a serial transmission rate of 51.84 megabits per second. The frame consists of two types of information, overhead and payload. Overhead comprises data required to route and control the frame. There are three types of SONET overhead: path, line and section. Payload is the customer data routed on the SONET network.

The payload, which has a maximum capacity of 49.536 Mbit/s on each STS-1 channel, could consist of a DS-3 signal at 44.736 Mbit/s or 28 DS-1s, each at 1.544 Mbit/s, a number of data channels, or other mappings. Several STS-1 frames can be combined for transport of payloads that have bandwidth requirements greater than 50 Mbit/s. This process of combining STS-1 payload envelopes is referred to as concatenation and the concatenation of N STS-1 frames is denoted STS-Nc. Concatenation increases the ratio of payload to overhead because redundant overhead information in the concatenated frames is replaced by additional payload. A single optical fibre can carry many STS channels. For example in STS-48, 48 channels are transmitted in the same optical fibre. When an STS-N signal is transmitted over a SONET network, the resulting optical signal is called "optical carrier N", or OC-N.

SONET networks comprise transport nodes and cross-connects. Transport nodes are typically connected by optical fibres in a ring topology, or a mesh topology. Data is loaded into a SONET payload at an originating transport node and transmitted from that transport node to adjacent transport nodes through one or more optical fibres. The payload observes SONET framing and channel structures and formats.

It would be desirable to connect LANS by a SONET network. This would provide wide-area network (WAN) performance using only LAN and SONET components. However, current SONET networks are poorly designed to efficiently carry such data traffic. More particularly, in a current SONET network, when an STS payload (i.e. the payload part of an STS frame) or a part of an STS payload or a number of concatenated STS payloads are used to transmit information between any two communicating devices, such as transport nodes, routers, servers, cross-connects, or switches, on the network, those payloads (or that bandwidth) are preassigned to those two communicating devices and are unavailable for data transmission between any other communicating devices, such as transport nodes, routers, servers, cross-connects, or switches, on the network. In other words if an STS payload is assigned to transmit data from a first communicating device to a second communicating device on a SONET network, no other data can be transmitted in that payload between other communicating devices on the network, even at times when there is no data that is being exchanged between the first and second communicating devices. In existing SONET networks, STS payloads are reserved for transmission of data between particular communicating devices for long periods of time. The payloads are reserved because in existing systems it is resource-intensive to re-allocate a channel. This makes existing SONET networks unsuitable for bursty, packetized data traffic.

A known SONET system is shown in FIG. 1. In communications network 400, LAN's 402a, 402b, 402c, 402d can communicate with each other via fibre optical pairs 403, but only in a cumbersome fashion. Each LAN is connected to a proximate transport node 404a, 404b, 404c, 404d via a bridger/router 406a, 406b, 406c, 406d. A separate interface 408 is required between a LAN and its proximate transport node for each other LAN with which it will exchange data packets. Between any two LAN's that wish to exchange data packets a separate STS payload must be pre-assigned.

For example between 402a and 402d payload 411 is assigned. If there are no packets to travel from LAN 402a to LAN 402d then the payload 411 will travel from 404a to 404d empty.

As shown in FIG. 1, by way of example, there are six channels between each transport nodes. Every clock period a payload 411 will be sent from one node to the adjacent node. Thus, the six channels are represented by one set of payloads 411, 412, 413, 414, 415, 416. As shown in the figure, each payload is pre-assigned to carry information between two specified transport nodes. The number of interfaces and preassigned payloads increases geometrically as additional LANS are associated with transport nodes on the SONET ring network. In contrast, as will become apparent, with the present invention only one interface is required between a LAN and its proximate transport node regardless of how many LAN's on the system wish to exchange data packets. As well, the number of payloads remains constant even when more LANs are added. Payload travel between nodes is not pre-assigned, but is shared dynamically and rationally.

Figure 2:
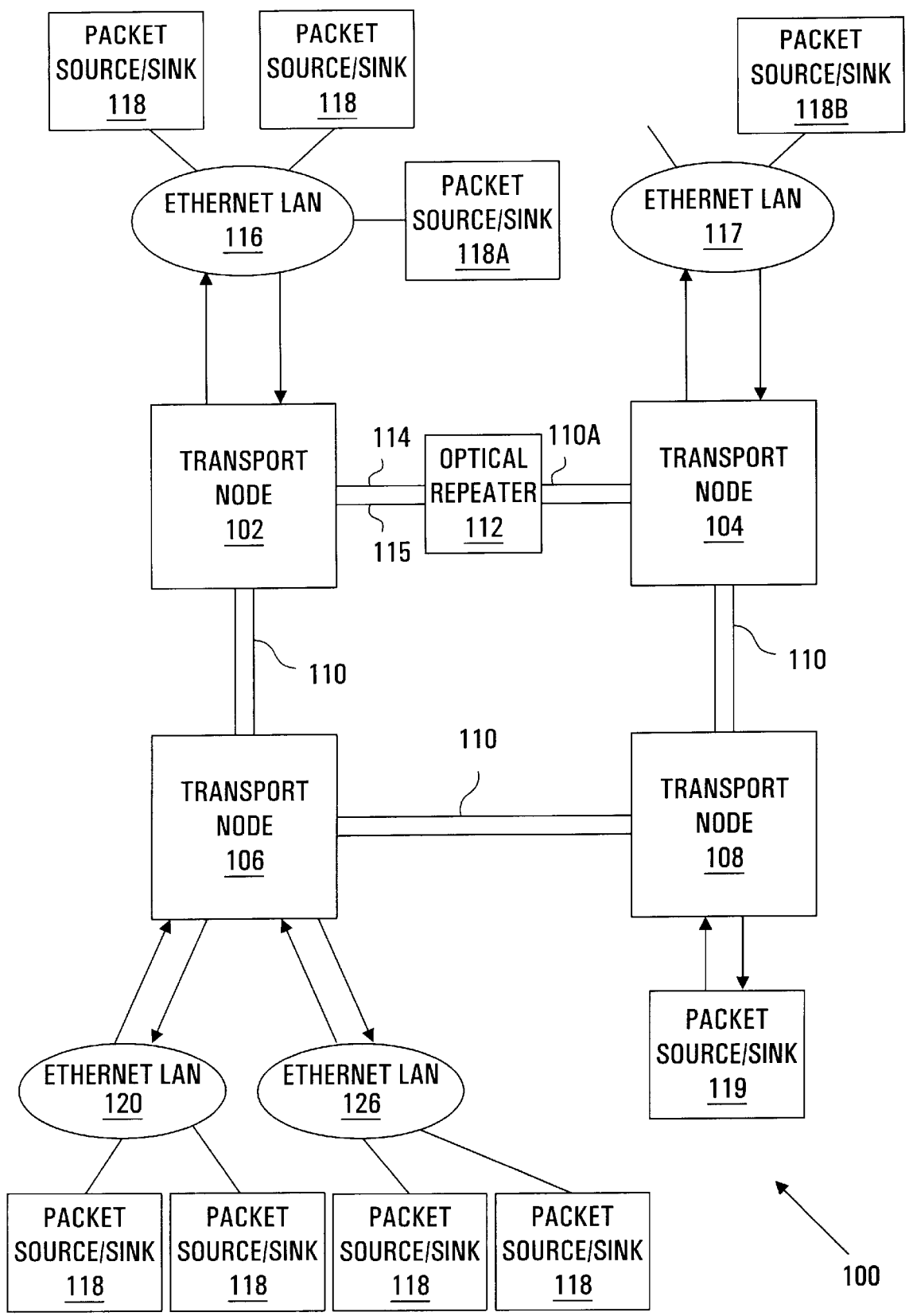
FIG. 2 is a schematic drawing of a communications system in accordance with one embodiment of the present invention.

Turning to FIG. 2, a communications system 100 made in accordance with this invention, has a number of transport nodes 102, 104, 106, 108. Transport nodes 102, 104, 106, 108 have between them fibre optic pairs 110. Between some transport nodes such as transport node 102 and transport node 104 there may be an optical repeater 112. As will be obvious to those skilled in the art, the transport nodes 102, 104, 106, 108 form a SONET ring network. As will also be apparent, more than one optical repeater could be located between two adjacent transport nodes.

In the preferred embodiment of the invention a single optical fibre is used for unidirectional transmission of optical signals from one transport node to an adjacent transport node. Thus, for example, one optical fibre 114 in fibre optic pair 110a transmits optical signals from transport node 102 to transport node 104 and the other optical fibre 115 in fibre optic pair 110a transmits optical signals from transport node 104 to transport node 102. In other words, the SONET network is bi-directional.

Transport node 102 is connected to a packet generating device such as local area network (LAN) 116 with a number of packet generating and receiving devices 118 connected to it. In the preferred embodiment LAN 116 is a gigabit ethernet LAN. Alternatively, a device could be the only device on the LAN and connected to a transport node, such as device 119 connected to transport node 108. As a further alternative, a transport node could be connected to more than one LAN. For example, transport node 106 is connected to LAN 120 and LAN 126. Each device 118, 119, has a different Medium Access Control (MAC) address. The MAC address uniquely identifies the device and is used to route data packets from one device to another. In overview, with communications system 100 ethernet data packets may be transmitted from a device 118a connected to LAN 116 to transport node 102. In node 102 these packets are included in one or more SONET payloads and transmitted on a dedicated SONET channel through optical fibre 110a to another transport node, such as transport node 104 on the SONET network, servicing, via LAN 117, a device, such as device 118b, having a destination MAC address found in the header of the ethernet data packets. Similarly, packets may be exchanged between LAN 116 and LAN 120, between LAN 117 and LAN 120 and between any of the LANs and device 119.

Ethernet data packets are included in SONET payloads by prefixing SONET header information and appending SONET trailer information to the data packets. At the destination transport node the ethernet data packets are removed from one or more SONET payloads, re-assembled if they were spread out over more than one SONET payload, and then transmitted to the destination device.

Initially when a given first packet generating device on a LAN, such as device 118a, transmits a data packet to a transport node, the data packet propagates around the SONET ring network in both directions. Tables in each transport node are updated with source address information relating to the first device and with information about the path in the SONET ring network the data packet has travelled. If another device replies to that first device, the stored source information and path information in the table in each transport node are used to route any packets back from the replying device to the first device. The stored source information and path information can also be used to help route data packets from any other device to the first device.

Ethernet data packets can have a variable size or length. Thus, a packet can be spread among one or more SONET payloads. As well, a single SONET payload could contain parts of more than one ethernet data packet. In the preferred embodiment, the method by which data packets are spread among one or more SONET payloads or are aggregated into a single payload is accomplished by a method known as HDLC-like framing, as is described in Internet Engineering Task Force documents RFC 1662 and 1619.

Figure 3:
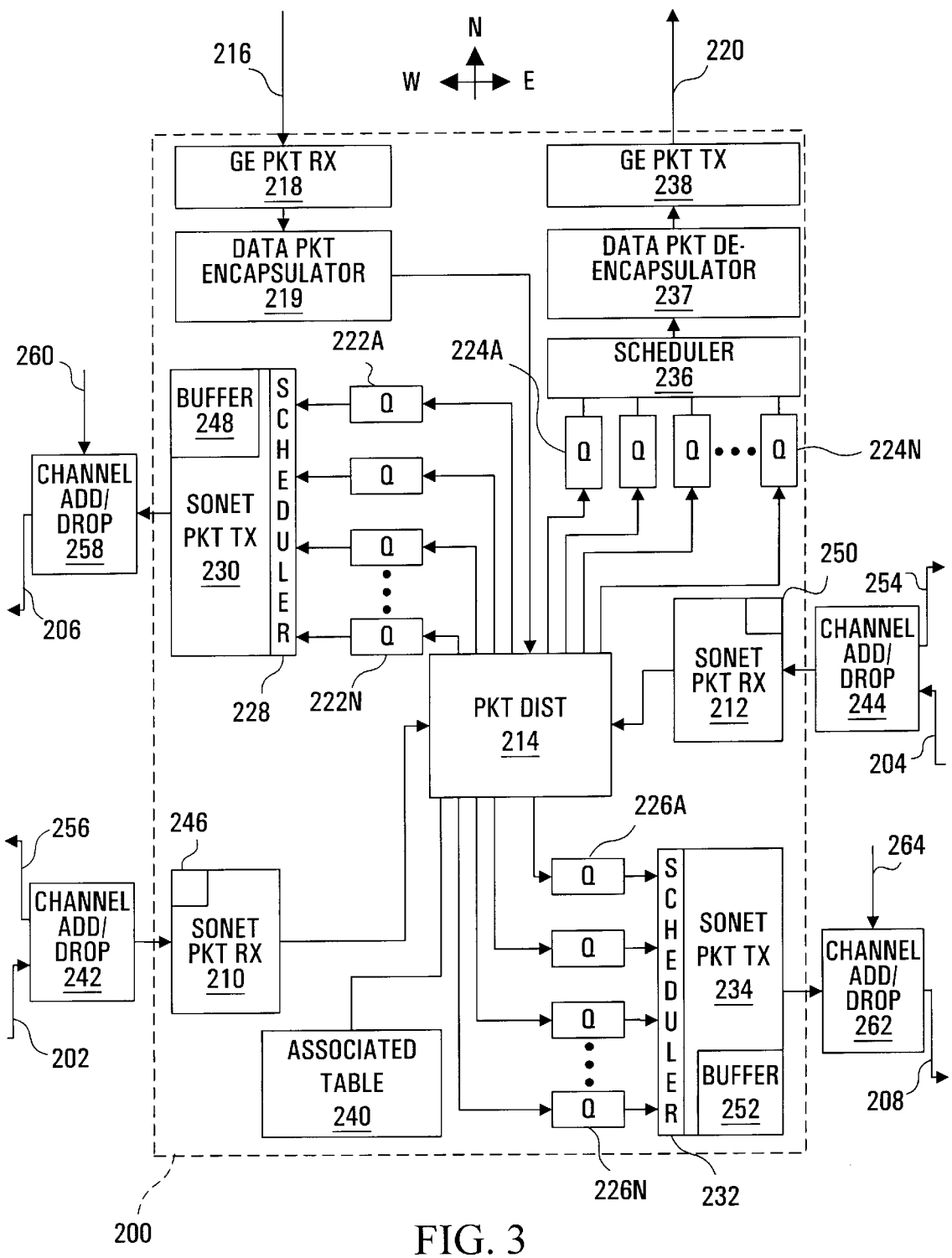
FIG. 3 is a schematic drawing of a portion of a transport node of the system of FIG. 2.

FIG. 3 shows a portion of a transport node 200 in accordance with the present invention. The transport node of which transport node portion 200 is a part receives SONET frames from optical fibres 202, 204 and transmits SONET frames to an output path, namely optical fibres 206, 208.

Optical fibre 202 is connected to a SONET transport node channel add/drop 242 which removes SONET section and line overhead information and then diverts SONET channels dedicated to the transport of data packets to SONET packet receiver 210. The SONET transport node channel add/drop is not part of the present invention but is shown to illustrate the context of an embodiment of the invention. Those SONET channels not dedicated to the transport of data packets are output on line 256 to the rest of the transport node to be handled in the usual manner for SONET channels. Similarly optical fibre 204 is connected to a SONET transport node channel add/drop 244 which removes SONET section and line overhead information and then diverts SONET channels dedicated to transport of data packets to SONET packet receiver 212, and diverts non-dedicated SONET channels to output line 254 which leads to the rest of the transport node to be handled in the usual manner for SONET channels. The SONET packet receivers 210, 212 determine when each SONET frame within the diverted channel or channels starts and ends. Packet receiver 210 detects the beginning and end of each SONET frame and removes data packets or parts thereof by removing SONET header and trailer path overhead information leaving only the encapsulated packets. A data packet can be spread over a number of SONET payload frames. The packet receiver 210 also detects the start and end of each data packet. A buffer 246 is used to store parts of a data packet received from different SONET payloads until the data packet is re-assembled in buffer 246 and can be transmitted in its entirety to packet distributor 214. SONET packet receiver 212 has a buffer 250 for a similar purpose.

Transport node 200 receives ethernet data packets from an associated ethernet LAN through input line 216 which is connected to an ethernet receiver 218. Ethernet data packets are transmitted from ethernet receiver 218 to data packet encapsulator 219. Preferably, data packets are encapsulated by appending a time-to-live (TTL) indicator and other information to the data packet. Preferably, the TTL indicator and other information are prefixed to the data packet. The use of the TTL indicator will be described below. The encapsulated data packets are then transmitted to packet distributor 214. As they travel through the communications system all data remains encapsulated. In other words, the prefixed information, such as the TTL indicator, is treated as part of the data packet.

The packet distributor 214 determines in a method described below how packets will be routed. A packet may be output on one or more of optical fibres 206, 208 and output path 220 which is connected to the associated ethernet LAN. Packets from the packet distributor may be loaded into a set of queues 222a . . . 222n, associated with scheduler 228, SONET transmitter 230, SONET transport node channel add/drop 258 and optical fibre 206. Alternatively, packets can be loaded into a second set of queues 226a . . . 226n associated with scheduler 232 and SONET transmitter 234, SONET transport node channel add/drop 262, and optical fibre 208. As a further alternative, packets can be loaded into a third set of queues 224a . . . 224n associated with scheduler 236, data packet de-encapsulator 237, ethernet transmitter 238 and output path 220. There can be any number of queues in each of the sets of queues.

The scheduler 228, 232, or 236 selects a particular queue from the set of queues with which it is associated and then transmits a packet from the selected queue to the transmitter. In the case of schedulers 228 and 232, the packet is transmitted to SONET transmitters 230 and 234, respectively. Assuming the packet is sized to fit in one SONET payload, the SONET transmitter appends SONET path overhead information to the packet, then transmits the packet to a SONET transport node channel add/drop 258 and 262 where SONET section and line overhead information is appended to the packet. The packet is then included in a SONET payload inserted into a SONET channel dedicated for data packet transport and recombined with channels not dedicated to data packet transport arriving on lines 260 and 264. The combined channels are output on an optical fibre 206 or 208. If the packet must be spread over a number of SONET payload frames, the packet is loaded into a buffer, such as buffer 248 or buffer 252, when the packet is received by SONET transmitters 230 and 234. Parts of each packet are removed from the buffer, have SONET overhead information appended and are included in a SONET payload and sent to the SONET transport node channel add/drop 258 and 262. This is repeated until the entire data packet has been transmitted. If a packet or end portion of a packet is smaller than a SONET payload, there will be a remaining unused portion of the SONET payload. In this situation a second data packet is selected from a queue associated with that output path and stored in the buffer. The part of the second data packet that will fit in the remaining portion of the SONET payload has SONET overhead information appended and is then included in the SONET payload and sent to the SONET transport node channel add/drop. One or more SONET other payloads will include any remaining portions of the second data packet. In the case of scheduler 236, the packet is transmitted to data packet de-encapsulator 237 which removes information added by the data packet encapsulator, such as a TTL indicator, and then transmits the packet to transmitter 238 which transmits the packet to the associated output path 220 to a LAN.

Data packets are intercepted and re-queued at each transport node. This differs from conventional SONET transmission in that in conventional SONET, an STS channel (comprising periodic payloads) is usually dedicated to traffic between two pre-determined transport nodes. In the present invention an STS channel (or, optionally, multiple channels or a part of a channel) is dedicated only to ethernet data packets. Those ethernet data packets can be received from or transmitted to any transport node on the SONET network.

Transmission to optical fibre 206 or reception from optical fibre 202 is commonly referred to transmitting to or receiving from the west. Similarly, transmission to optical fibre 208 or reception from optical fibre 204 is commonly referred to as transmitting to or receiving from the east. The east and west directions are part of the SONET ring network. Similarly, transmission to or reception from a line not connected to the SONET ring network, such as output line 220 or input line 216 is commonly referred to as transmitting to or receiving from the north.

The manner in which data packets are routed from one device to another device will now be described in more detail.

An ethernet data packet contains a header which has both a source MAC address and a destination MAC address. The source MAC address is the address of the device transmitting the ethernet data packet. In a preferred embodiment of the present invention, the source MAC address is used to assist with efficient routing of encapsulated ethernet data packets on the SONET network. With reference to FIG. 3, this is accomplished in the following way:

Step 1

When an ethernet data packet is received, it is sent to the packet distributor 214, along with information about whether the packet was received from optical fibre 202, 204, or input line 216. In other words, whether the packet was received from the west, east or north.

Step 2

Packet distributor 214 places in an associated table 240 the source MAC address and an identifier of the input source, namely optical fibre 202, 204 or input line 216. The identifier could be expressed as the direction north, west or east.

Step 3

Packet distributor 214 reads the destination MAC address of the ethernet data packet. The destination MAC address could be read directly from the ethernet packet header. Alternatively, where data packet encapsulator 219 is configured to read the ethernet packet header and prefix the source and destination MAC addresses to the packet, the packet distributor may obtain the destination MAC address from this alternate source. Packet distributor 214 refers to table 240 to determine if there is a table entry for a source MAC address in the table identical to the destination MAC address of the ethernet data packet. If there is a matching source MAC address, the packet distributor 214 reads the identifier of the input source corresponding to the source MAC address. Each input source has an associated output source. For example the output source associated with input optical fibre 202, or the west direction, is output optical fibre 206. Similarly, the output source associated with input path 216, or the north direction, is output path 220.

After the packet distributor 214 reads the identifier of the input source it will assign the received ethernet data packet to one of the set of queues leading to the output source associated with the input source identifier of the matching source MAC address.

A benefit of the routing of data packets disclosed by the present invention is that it allows packets to flow between nodes even when there was no pre-assigned payload between the two nodes.

It is possible that there will be no table entry with a source MAC address identical to the destination MAC address of the ethernet data packet. If this happens, the original and a copy of the ethernet data packet will be sent to all output paths connected to the transport node, except that no copy is transmitted to the output path associated with the input path from which the ethernet data packet was received by the transport node. Thus, for example, if an ethernet data packet arrives from optical fibre 202, and there is no relevant entry in table 240, the original packet will be queued for transmission on output line 220 and a copy will be created and queued for transmission on optical fibre 208. Similarly, if an ethernet data packet arrives from input line 216 and there is no relevant entry in table 240, the original packet is queued for distribution on optical fibre 206 and a first copy of the packet is created and queued for transmission on optical fibre 208.

In the present invention, an STS channel or group of channels or subset of a channel is set aside to transmit ethernet data packets. At each transport node 200, data packets are removed from the SONET payloads received from the set-aside channel and the ethernet data packets go into the packet distributor 214. If an ethernet data packet has a destination MAC address belonging to a device in the north direction, (that is, connected to an ethernet LAN that is connected to the transport node 200), the ethernet data packet will be queued up for transmission on the output line 220. The set-aside STS channel which has released or dropped off its SONET payloads will then have capacity to accept a new encapsulated packet. The new packet will be taken from one of the queues 222*a* . . . 222*n*; 226*a* . . . 226*n* associated with SONET transmitters 230, 234. In the preferred embodiment, each queue in a set of queues corresponds to packets from a unique source MAC address. In these sets of queues the letter "n", such as in "222*n*", represents any arbitrary number of queues. These queues could contain ethernet data packets that were transmitted from input line 216 to transport node 200. These queues also contain ethernet data packets that are not destined for output line 220 but were received from other transport nodes via the SONET network. The set-aside STS channel will continuously transmit data packets from a transport node to its adjacent transport node, if any data packets are queued for transmission. Because packets are re-queued at each transport node, contention is easily managed by schedulers 228, 232, 236. Moreover, contention can be managed even though LAN devices are spread out over large distances.

In the preferred embodiment, a time to live (TTL) indicator, set at a pre-determined number, is prefixed to each ethernet data packet in the data packet encapsulator 219. The prefixed TTL indicator will be removed by data packet de-encapsulator 237 before an ethernet data packet is transmitted to an ethernet LAN by ethernet transmitter 238. The TTL indicator is decremented every time the ethernet data packet is de-encapsulated and re-queued at a transport node.

When the TTL indicator reaches zero, the next transport node that receives it does not re-queue the ethernet data packet but discards it. A TTL indicator is typically set at a pre-determined number so that the encapsulated ethernet data packet must make at least one complete circuit of the SONET ring network before it is discarded. An encapsulated ethernet data packet will make a complete circuit if a destination MAC address is specified that does not exist or is disabled, or is not known to exist.

Figure 4:
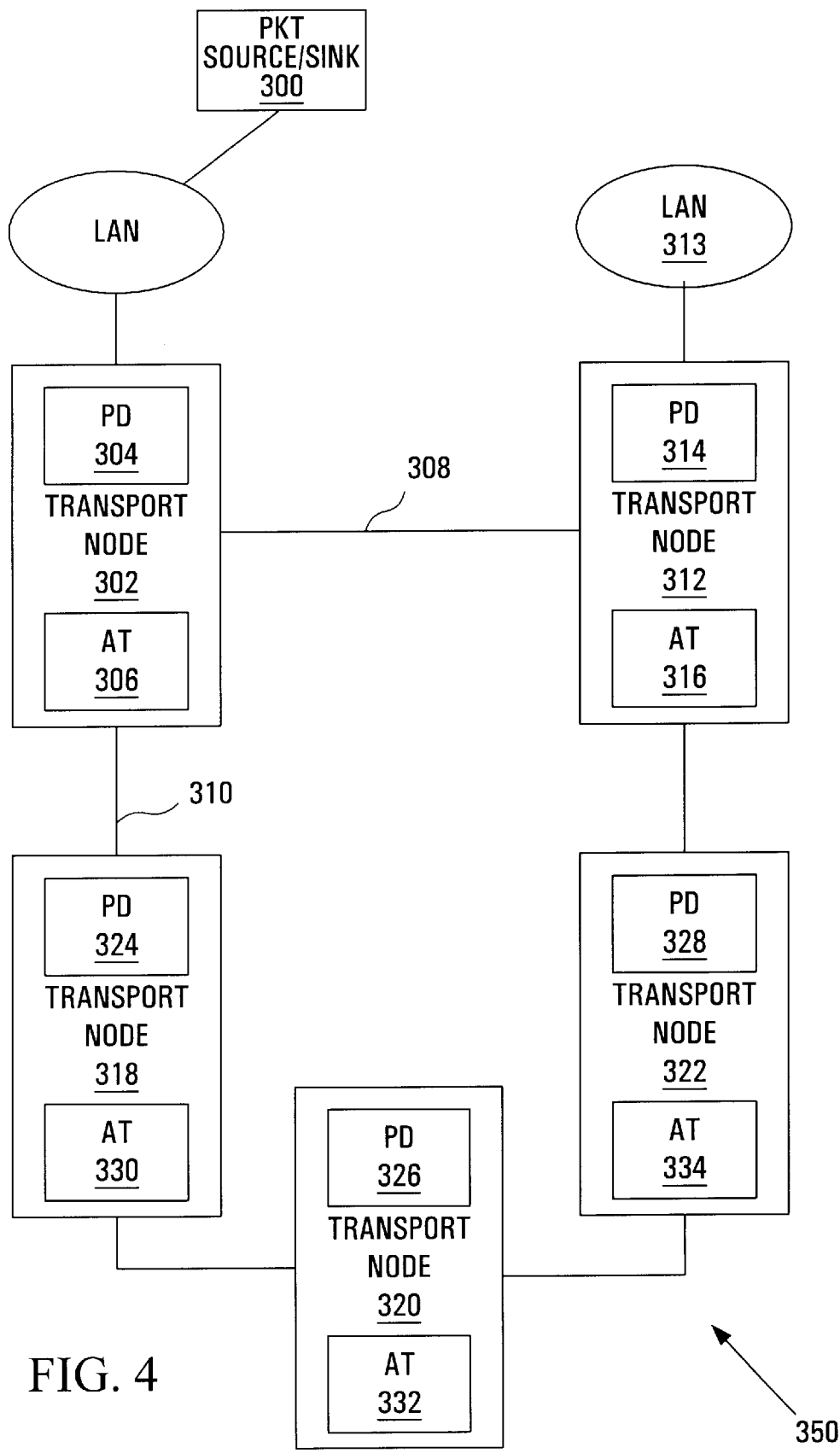
FIG. 4 is a schematic drawing of a communications system in accordance with another embodiment of the present invention.

A TTL indicator of a packet can also be used to assist a transport node attached to a SONET ring to find the shortest path to the destination MAC address for the packet from that transport node. Referring to FIG. 4, the shortest path is found as follows:

Step 1

A device 300 transmits an ethernet data packet to transport node 302 of SONET ring 350. A TTL indicator is set at a pre-determined value and prefixed to the ethernet data packet. A packet distributor 304 in transport node 302 checks an associated table 306 to see if the destination MAC address appears on table 306. If it does not, the original ethernet data packet is queued up in a queue associated with optic fibre pair 308. Also, a first copy of the ethernet data packet is created and queued up in a queue associated with optic fibre pair 310 for transmission to transport node 318. Preferably, a broadcast bit is set in the SONET overhead header for each payload holding the packet.

The original ethernet data packet is transmitted to transport node 312. In transport node 312, packet distributor 314 checks associated table 316 for an entry corresponding to the destination MAC address. If it is not found, the original ethernet data packet is re-queued for transmission to transport node 322. A second copy of the ethernet data packet will be created and queued for transmission to ethernet LAN 313. Further at packet distributor 314 of transport node 312, an entry is made in an associated table 316 of (i) the source MAC address of device 300, (ii) an identifier of the input source or direction, namely optic fibre 308, and (iii) the value of the TTL indicator in table 316 associated with the packet distributor 314. This process continues at each transport node such that when (the original or a copy of) the packet reaches each transport node, the packet distributors 314, 328, 326, 324 associated with each transport node checks if the source MAC address is in its associated tables 316, 334, 332, 330. If it is not, (i) the source MAC address of device 300, (ii) identifier of the input source, and (iii) TTL value are stored in its tables 316, 334, 332, 330 and extra copies of the ethernet data packet are created for transmission to any LANs or other output paths associated with those transport nodes. At each transport node, the TTL associated with the ethernet data packet is decremented.

Meanwhile, the first copy of the ethernet data packet travels around the SONET ring in the opposite direction. Thus, each transport node will receive both the original ethernet data packet and the first copy ethernet data packet. Because the original ethernet data packet and first copy ethernet data packet travel in opposite directions, either packet could be received first by a transport node, depending on the location of the transport node. The first time a packet from a given source is received by a node, it results in the creation of an entry in the transport nodes' associated table. Subsequent packets received from this source are compared with this entry. Thus, if the source MAC address is in the associated table, the value of the TTL indicator of the stored value and the value of the TTL indicator associated with the subsequently received packet are compared. A higher value of TTL indicator indicates fewer transport nodes between the source MAC address and that transport node. The associated table saves the source MAC address, identifier of the input source or direction and TTL value associated with the higher TTL value and discards the source MAC address, identifier of the input source and TTL value associated with the lower TTL value. Then as described above, subsequent packets with a destination MAC address equal to the source MAC address stored on the associated table are routed to the output path associated with the input source identifier. In this way, the subsequent packets are routed in the direction which will have the fewest intervening transport nodes.

The original packet and the first copy packet are not re-queued when they reach the transport node 302 from which they were first transmitted. Alternatively, they are discarded when their TTL has decremented to zero. In a preferred embodiment, the entries on the associated tables are timestamped and deleted after a fixed amount of time, such as is specified in IEEE standard 802.1D.

Although the description has referred to SONET rings and SONET network rings, the invention applies generally to SONET networks, such as a SONET mesh network. The exception to this is finding the shortest path, which requires a bi-directional ring. The described method of using a TTL indicator to find the shortest path to a given address is not restricted to SONET rings. It is applicable to any system sending packetized data having source and destination addresses in the packet over a bidirectional loop network.

Occasionally a path between two transport nodes will fail. For example, it may be impossible to transmit packets from transport node 302 to transport node 312 through optical fibre pair 308. This failure is detected by an operator or by operations and maintenance devices. When this happens, all entries in table 306 where the input source identifier is associated with optical fibre 308 are deleted. This ensures that subsequent packets will not be queued in this direction. As well, packets are removed from the queue for output optical fibre 308 and transferred to another queue.

Numerous modifications, variations and adaptations may be made to the particular embodiments of the invention described above without departing from the scope of the invention which is defined in the claims.

What is claimed is:

1. A method for routing data packets at a transport node of a SONET network comprising:
   (a) receiving SONET payloads having data packets at said transport node;
   (b) removing said data packets for said SONET payloads;
   (c) for each data packet of said data packets:
      (i) determining a destination address;
      (ii) determining if an entry exists in a table associated with said transport node matching said destination address; and
      (iii) if a matching entry does not exist, queuing said each data packet on a first queue for a first output path and a copy of said each data packet on a second queue for a second output path;
   (d) transmitting selected data packets from said first queue onto said first output path; and
   (e) transmitting selected data packets from said second queue into said second output path.

2. A method for routing data packets at a transport node of a SONET network comprising:
   (a) receiving SONET payloads having data packets at said transport node;
   (b) removing said data packets from said SONET payloads; for each data packet of said data packets:
      (i) selecting an output path;
      (ii) determining whether a current time-to-live "TTL" indicator having a current value has been appended to said each data packet;
      (iii) if said current TTL indicator has not already been appended, appending a new TTL indicator having an initial value to said each data packet; and
      (iv) if said current TTL indicator has already been appended to said each data packet, decrementing said current value of said current TTL indicator;
      (v) where any said current value exceeds a threshold, queuing said each data packet on a queue associated with said selected output path;

(c) transmitting data packets from each said queue.

3. The method as claimed in claim 2 wherein said SONET network is a SONET ring and further comprising:
for said each data packet:
(i) associating said each data packet with an identifier of an input path from which said each data packet was received;
(ii) determining presence of an existing entry in a table associated with said transport node matching a source address of said each data packet;
(iii) if there is no said existing entry, creating a new entry in said associated table containing (I) said source address of said each data packet, (II) said identifier and (III) the current value of any said current TTL indicator; and
(iv) on finding said existing entry with said matching source address in said table, creating a new table entry based on said each data packet and deleting said existing entry if the current value of any said current TTL indicator of said each data packet is higher in said each data packet than that in said existing entry.

4. The method as claimed in claim 2 further comprising:
(a) dropping any said each data packet from said transport node if its TTL indicator has decremented to zero.

5. The method as claimed in claim 1 wherein said first output path and said second out path are on the SONET network and further comprising:
including said selected data packets in one or more SONET payloads prior to transmitting said data packets.

6. The method as claimed in claim 5 wherein each of said first output path and said second output path comprises an optical fibre.

7. The method claimed in claim 1 further comprising:
if said matching entry exists, reading from said associated table an identifier of a designated output path associated with said destination address, and queuing said each data packet on said designated output path.

8. The method claimed in claim 7 further comprising the steps of:
(a) receiving an indication an output path is not functional; and
(b) deleting any entries in said table containing an identifier of said non-functional output path.

9. The method as claimed in claim 1 wherein said second output path comprises an input to a local area network.

10. The method as claimed in claim 1 further comprising:
for each data packet:
determining a source address of said each data packet;
associating said each data packet with an identifier of an input path from which said each data packet was received;
determining if an entry exists in a table associated with said transport node matching said source address of said each data packet and, if said entry matching said source address does not exist, creating a new entry in said associated table containing (i) said source address of said each data packet, and (ii) said identifier.

11. A method for routing data packets at a transport node in a SONET network, said transport node capable of receiving packets from and transmitting packets to the north, west and east directions, said west and east directions transmitting to or receiving from said SONET network, said north direction for transmitting to or receiving from a data packet generating device, said method comprising:

(a) receiving a received data packet from one direction of the north, west or east directions;
(b) removing said received data packet from one or more SONET payloads when said received data packet is received from the east or west direction;
(c) determining a destination address for said received data packet;
(d) consulting a table for said destination address and if no matching entry exists, creating a copy of said received data packet;
(e) queuing said received data packet on a first queue associated with a first output path for a direction other then said one direction from which said received data packet was received;
(f) queuing said copy of said received data packet on a second queue associated with a second output path for a direction other than said direction from which said received data packet was received and other than a direction associated with said first output path;
(g) selecting a selected data packet from said first queue;
(h) including said selected data packet in one or more SONSET payloads if said first output path is in the east or west direction; and,
(i) transmitting said selected data packet on said first output path.

12. An apparatus for routing data packets in a SONET network comprising:
(a) a plurality of SONET packet receivers for receiving SONET payloads, each SONET payload containing at least part of a data packet;
(b) a plurality of data packet receivers for receiving data packets;
(c) a packet distributor,
(i) said packet distributor connected to each of said plurality of SONET packet receivers and to each of said plurality of data packet receivers; and
(ii) said packet distributor for receiving data packets from said plurality of SONET packet receivers and data packet receivers;
(d) a plurality of output paths;
(e)
(f) at least one queue associated with each of said plurality of output paths,
said at least one queue for receiving routed data packets;
(f) in means for routing each data packet to a selected output path by:
determining a destination address for said each data packet;
determining if an entry exists in a table matching said destination address; and
if a matching entry does not exist, queuing said each data packet on a first queue associated with a first output path and a copy of said each data packet on a second queue associated with a second output path;
(g) a scheduler associated with each said at least one queue for selecting a data packet from one of said at least one queue;
(h) a transmitter for transmitting said selected data packet to an output path.

13. A method for selecting a shortest path to a destination address for data packets containing source and destination addresses in a bi-directional ring network comprising:
(a) receiving said data packets at a node;

(b) for each received data packet of the received data packets;
  (i) appending a new Time-To-Live "TTL" indicator having an initial value to said each received data packet if a TTL indicator has not already been appended;
  (ii) decrementing an existing value of an existing TTL indicator if said existing TTL indicator has already been appended to said each received data packet;
  (iii) comparing said source address of said each received data packet with source address entries in an associated table and on not finding a source address match,
    (I) associating said each received data packet with an identifier of an output path associated with an input path from which said each data packet was received;
    (II) creating an entry in said associated table containing:
      (A) said source address of said each received data packet, (B) said identifier, and (C) the value of the TTL indicator appended to said each data received packet;
    and on finding said source address march creating a new table entry based on said each received data packet and deleting an existing matching entry if a value of the TTL indicator appended to said each received data packet is higher tan that in said existing entry;
  (iv) determining a destination address for said each received data packet;
  (v) determining if an entry exists in said associated table matching said destination address for said each received data packet,
  (vi) if said entry matching said destination address exists, reading from said associated table an identifier of an associated output path, and selecting said associated output path for said each received data packet;
  (vii) if said entry matching said destination address does not exist,
    (A) selecting a target output path for said each received data packet;
    (B) creating at least one copy of said each received data packet;
    (C) selecting a different output path for each said at least one copy of said each received data packet, each said different output path being other than said target output path.

14. An apparatus for routing data packets at a transport node of a SONET network comprising:
  (a) means for receiving SONET payloads having data packets at said transport node;
  (b) means for removing said data packets from said SONET payloads,
  (c) means for, for each of said data packets:
    (i) determining a destination address;
    (ii) determining if an entry exists in a table associated with said transport node matching said destination address;
    (iii) if a matching entry does not exist, queuing said each of said data packets on a first queue for a first output path and a copy of said each of said data packets on a second queue for a second output path;
  (d) means for transmitting selected data packets from said first queue onto said first output path and selected data packets from said second queue onto said second output path.

15. An apparatus for selecting a shortest path to a destination address for data packets containing source and destination addresses in a bi-directional ring network comprising:
  (a) means for receiving said data packets at a node;
  (b) means for, for each received data packet of the received data packets;
    (i) appending a new Time-To-Live "TTL" indicator having an initial value to said each received data packet if a TTL indicator has not already been appended;
    (ii) decrementing an existing value of an existing TTL indicator if said existing TTL indicator has already been appended to said each received data packet;
    (iii) comparing said source address of said each received data packet with source address entries in an associated table and on not finding a source address match,
      (I) associating said each received data packet with an identifier of an output path associated with an input path from which said each received data packet was received;
      (II) creating an entry in said associated table containing:
        (A) said source address of said each received data packet, (B) said identifier and (C) the value of the new TTL indicator or the existing TTL indicator appended to said each received data packet;
      and on finding said source address match, creating a new table entry based on said each received data packet and deleting an existing matching entry if a value of the new TTL indicator or the existing TTL indicator appended to said each received data packet is higher than that in said existing matching entry;
    (iv) determining a destination address for said each received data packet;
    (v) determining if an entry exists in said associated table matching said destination address for said each received data packet,
    (vi) if said destination matching entry exists, reading from said associated table an identifier of an associated output path, and selecting said associated output path for said each received data packet;
    (vii) if said destination matching entry does not exist,
      (A) selecting a target output path for said each received data packet;
      (B) creating at least one copy of said each received data packet;
      (C) selecting a different output path for each said at least one copy, each said different output path being other than said target output path.

16. The method of claim 2 further comprising:
  determining a destination address for said each data packet;
  determining if an entry exists in a table associated with said transport node matching said destination address;
  if said entry does not exist, creating at least one copy of said each data packet and selecting an output path for said at least one copy different from said output path selected for said each data packet.

17. A method for routing data packets at a Transport node of a SONET network comprising:
  (a) receiving SONET payloads having data packets at said transport node;

(b) removing said data packets from said SONET payloads;
(c) for each data packet of said data packets:
  determining a destination address;
  determining if an entry exists in a table associated with said transport node matching said destination address;
  if an entry matching said destination address does not exist:
    queuing said each data packet on a selected queue for a selected output path;
    queuing a plurality of copies of said each data packet on a like plurality of remaining queues for remaining output paths, said remaining output paths comprising output paths other than said selected output path;
(d) transmitting data packets to said selected output path from said selected queue and to said remaining output paths from said remaining queues.

18. The method of claim 17 wherein said receiving SONET payloads having data packets comprises receiving SONET payloads on a first input path, said first input path being associated with an associated output path and wherein said selected output path and said remaining output paths comprise output paths other than said associated output path.

19. A method for routing data packets at a transport node of a SONET network comprising:
  receiving SONET payloads having data packets at said transport node;
  removing said data packets from said SONET payloads;
  for each data packet of said data packets;
    (i) determining whether a current time-to-live "TTL" indicator having a current value has been appended to said each data packet;
    (ii) if said current TTL indicator has been appended to said each data packet, adjusting said current value of said current TTL indicator and where any said current value bears a pre-defined relationship to a threshold, outputting said each data packet.

20. The method of claim 19 further comprising, for said each data packet;
  (iii) if said current TTL indicator has not already been appended, appending a new TTL indicator having an initial value to said each data packet and outputting said each data packet.

21. The method of claim 20 further comprising, for said each data packet:
  determining a destination address;
  determining if an entry exists in a table associated with said transport node matching said destination address;
  if a matching entry does not exist:
    queuing said each data packet on a selected queue for a selected output path;
    queuing a plurality of copies of said each data packet on a like plurality of remaining queues for remaining output paths, said remaining output paths comprising output paths other thad said selected output path;
  transmitting data packets to said selected output path from said selected queue and to said remaining output paths from said remaining queues.

22. The method of claim 21 wherein said receiving SONET payloads having data packets comprises receiving SONET payloads on a first input path, said first input path being associated with an associated output path and wherein said selected output path, and said remaining output paths comprise output paths other than said associated output path.

* * * * *

UNITED STATES PATENT AND TRADEMARK OFFICE
CERTIFICATE OF CORRECTION

PATENT NO.    : 6,222, 848 B1                                        Page 1 of 1
DATED         : April 24, 2001
INVENTOR(S)   : Kenneth Gary Hayward It is certified that error appears in the above-identified patent and that said Letters Patent is hereby corrected as shown below:

Column 2,
Line 9, replace "another aspect," with -- In another aspect --

Column 10,
Line 34, replace "packets for" with -- packets from --

Column 11,
Line 26, replace "second out path" with -- second output path --

Column 12,
Line 14, replace "then said one" with -- than said one --
Line 23, replace "SONSET" with -- SONET --
Lines 43-44, replace "(c)(f) at least" with -- (c) at least --
Line 48, replace "in means for" with -- means for --

Column 13,
Line 23, replace "march" with -- match --
Line 27, replace "tan that" with -- than that --
Line 54, replace "payloads," with -- payloads; --

Column 14,
Line 64, replace "Transport" with -- transport --

Column 16,
Line 5, replace "outputing" with -- outputting --
Line 7, replace "packet;" with -- packet: --
Line 23, replace "thad said" with -- than said --
Line 32, replace "path, and" with -- path and --

Signed and Sealed this

Thirteenth Day of August, 2002

*Attest:*

JAMES E. ROGAN
*Attesting Officer*    *Director of the United States Patent and Trademark Office*